United States Patent [19]

Walsh et al.

[11] Patent Number: 4,827,330
[45] Date of Patent: May 2, 1989

[54] AUTOMATIC DOCUMENT IMAGE REVISION

[75] Inventors: John M. Walsh, Los Gatos; David M. Ott, Alameda, both of Calif.

[73] Assignee: Litton Industrial Automation Systems, Inc., Alameda, Calif.

[21] Appl. No.: 75,798

[22] Filed: Jul. 20, 1987

[51] Int. Cl.⁴ .............................................. H04N 1/40
[52] U.S. Cl. ...................................... 358/280; 382/57
[58] Field of Search ................ 358/280, 22, 135, 136, 358/105, 85; 382/56, 57, 41; 340/717, 734

[56] References Cited

U.S. PATENT DOCUMENTS

| | | | |
|---|---|---|---|
| 4,121,196 | 10/1978 | Johnson et al. | 382/41 |
| 4,249,212 | 2/1981 | Ito et al. | 358/22 |
| 4,633,506 | 12/1986 | Kato | 358/22 |

OTHER PUBLICATIONS

Matsui et al., "High–Speed Transmission of Sequential Freeze–Pictures by Extracting Charged Areas", IEEE Transactions, vol. Com-29 #12 pp. 1977-1981.

Don R. Searle, et al., "Experiences In Applying Digital Optical Technology to the Automation of Engineering Drawing Storage and Retrieval," 85-JPGC-Pwe-60, Joint ASME/IEEE Power Generation Conference, Milwaukee WI Oct. 20-24, 1985 (pp. 1-8).

I. Sobel, "Neighborhood Coding of Binary Images For Fast Contour Following and General Binary Array Processing," *Computer Graphics and Image Processing*, vol. 8, 1978, pp. 127-235 (1978 Academic Press, Inc.).

*Primary Examiner*—James J. Groody
*Assistant Examiner*—David E. Harvey
*Attorney, Agent, or Firm*—Townsend and Townsend

[57] ABSTRACT

A system for electronically storing revisions or modifications to documents which are already electronically stored in unrevised or unmodified form. The system compares, at the pixel-by-pixel level, a modified document bit map with a stored document bit map and determines from the differences between the two bit maps, at the pixel-by-pixel level, which differences are significant and which are insignificant. A revised document bit map is then formed from the portions of the stored-document bit map exhibiting no significant bit map differences and the significant differences bit map. The result is a revised document bit map in which no unnecessary changes have been introduced into the initial stored-document bit map. The system also includes steps for defining, on a pixel-by-pixel basis, a significant region bit map from the significant difference bit map and for forming the revised document bit map using the significant region bit map.

8 Claims, 5 Drawing Sheets

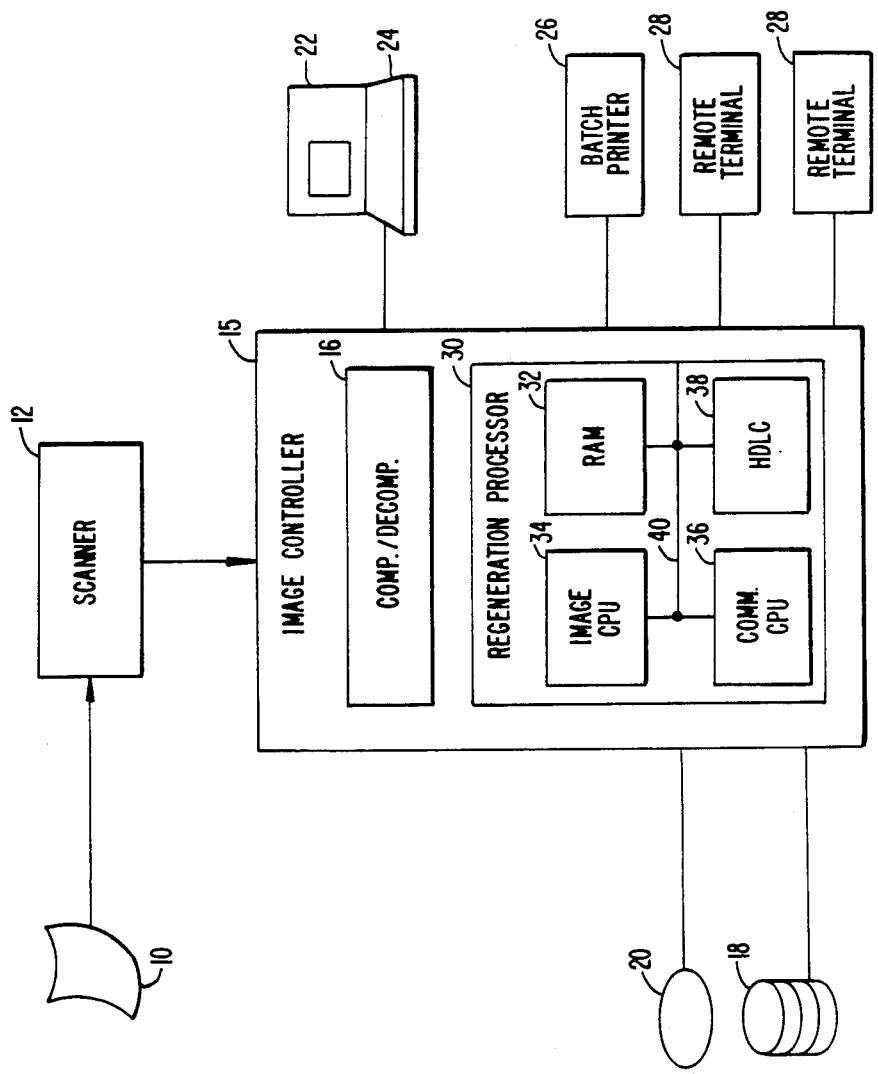
FIG._1.

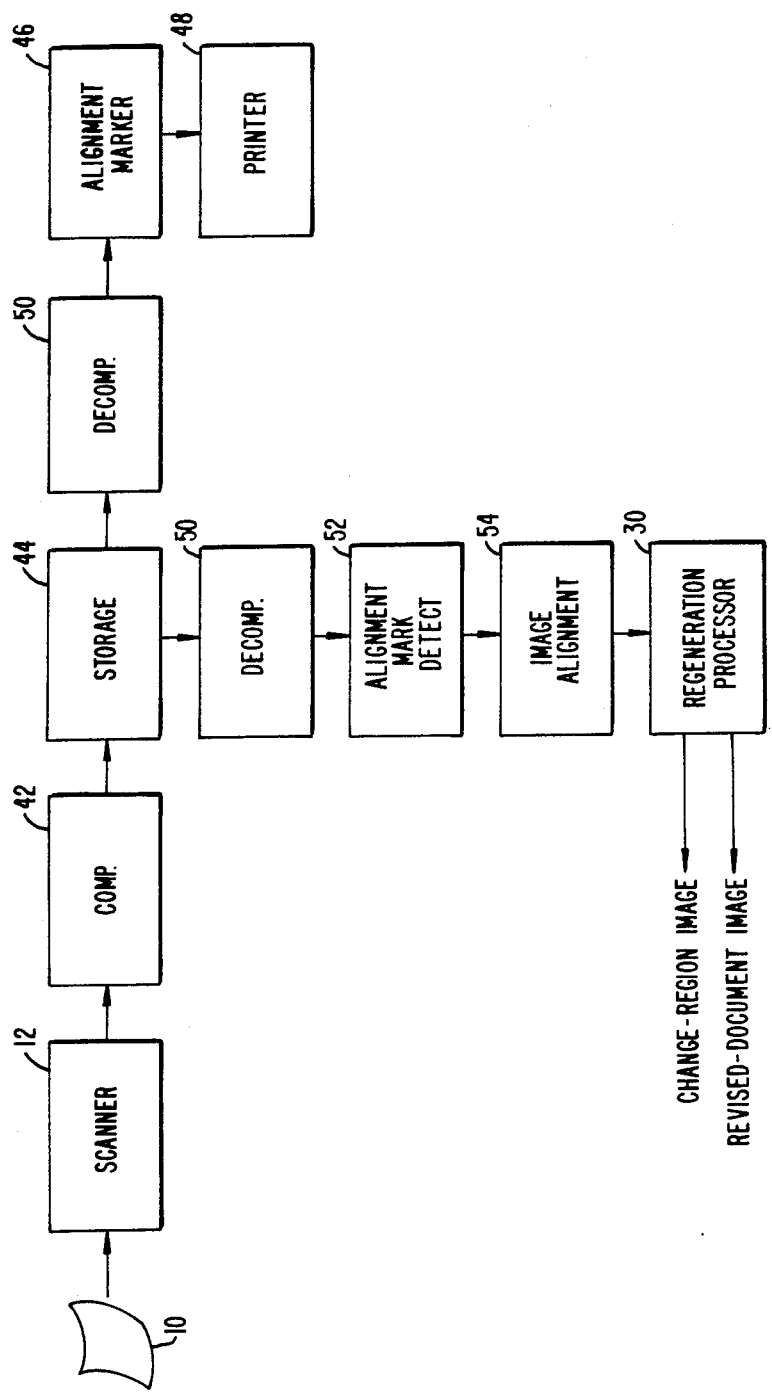

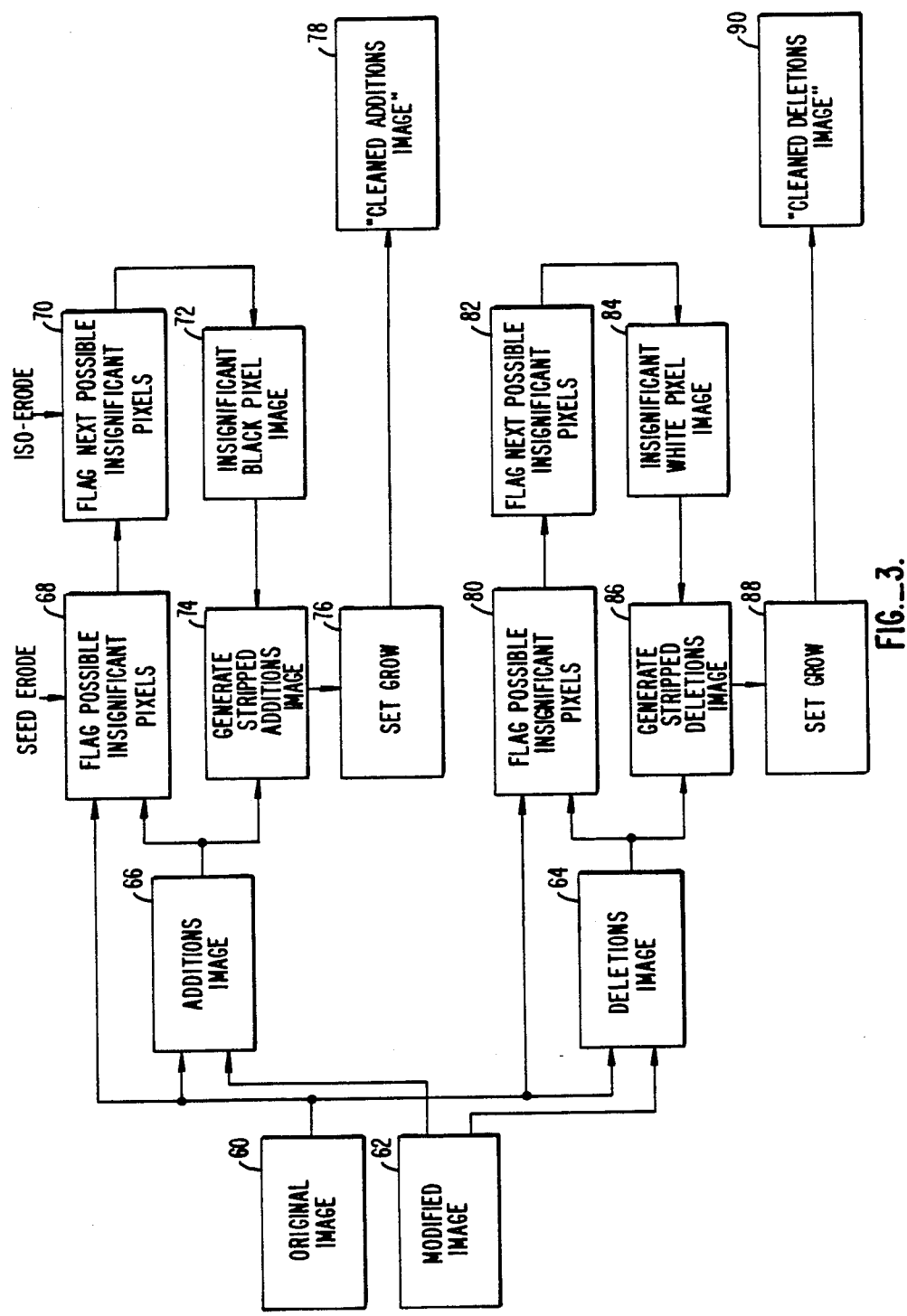
FIG._3.

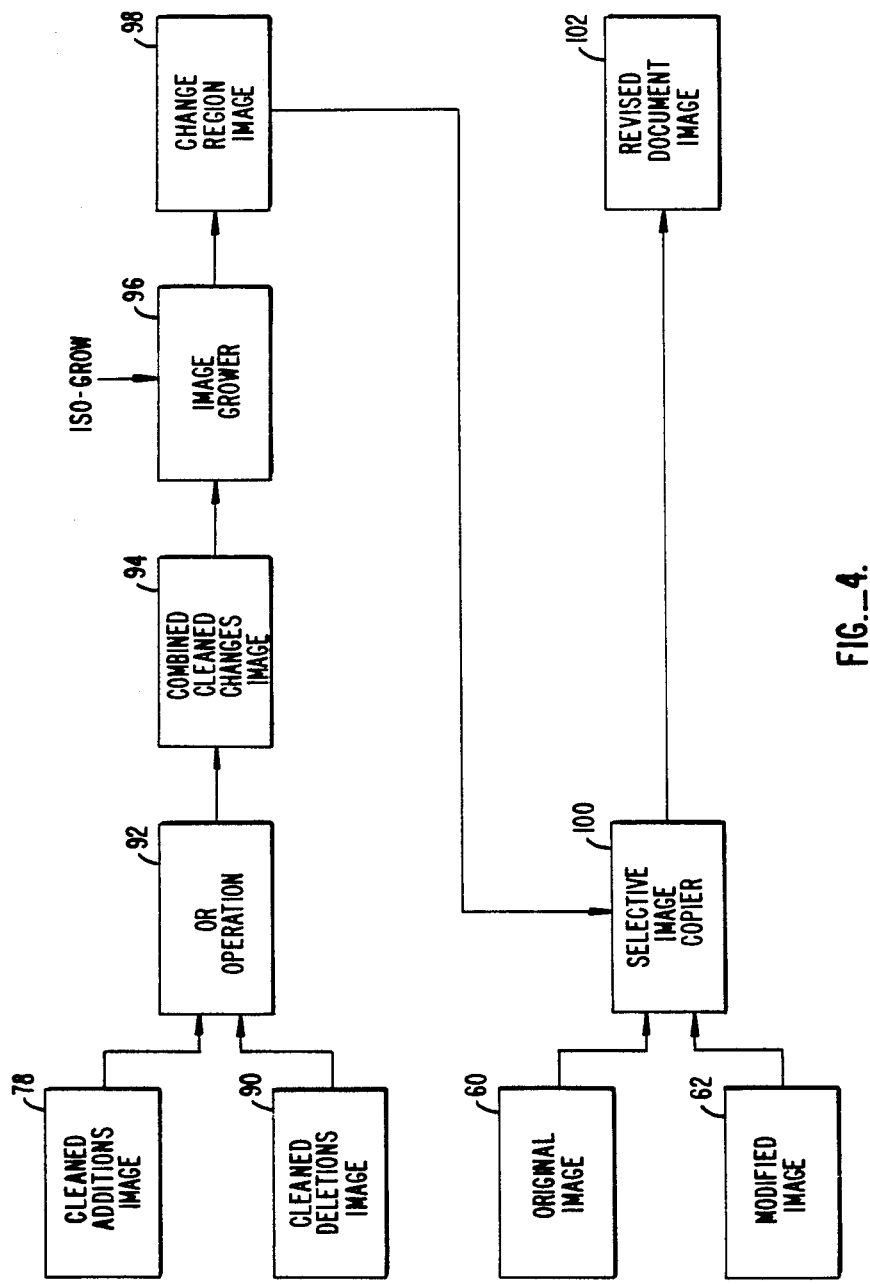

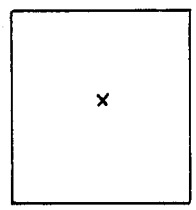
FIG._5A.
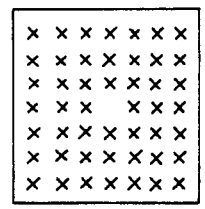
FIG._5B.
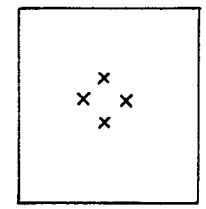
FIG._5C.
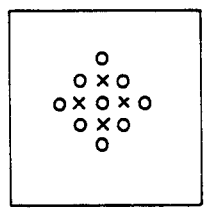
FIG._5D.
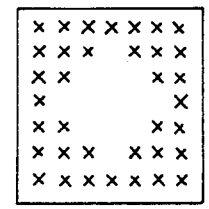
FIG._5E.
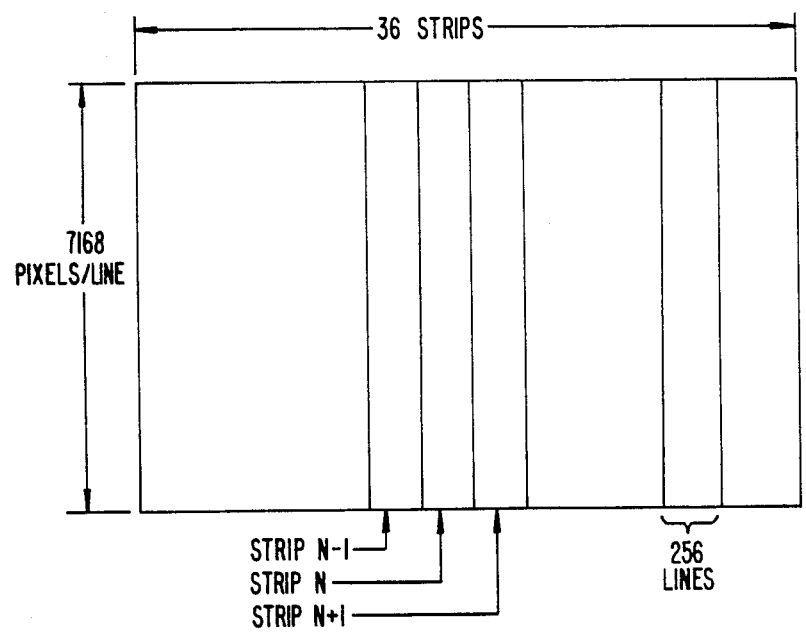
FIG._6.

AUTOMATIC DOCUMENT IMAGE REVISION

BACKGROUND OF THE INVENTION

1. Field of the Invention

The present invention relates generally to the electronic storage, retrieval, and distribution of documents, and is particularly directed to methods and apparatus for electronically handling revisions or other modifications to documents.

2. Background of the Invention

Document storage, retrieval and distribution systems which store documentation in electronic format have been known for some time. Known systems may include document scanners which capture and binarize images of the documents, data compressors for storing the images in compressed format to reduce the amount of storage needed various types of memory for storing the images, and networks to permit remote access to the stored documents for viewing and hardcopy printing. Typically, magnetic memory is used for short-term storage and optical disks are used for long-term archival storage.

The type of documents with which these systems are used may encompass any type of graphics or writing on paper. The documents typically range from $8\frac{1}{2}''\times 11''$ office type documents with text and/or graphics, to large E sized ($34''\times 44''$) engineering or architectural drawings.

There is a trade-off in the scanning-binarization process: capture of fine detail in a document requires high resolution scanning and is relatively expensive to produce because a larger number of data bits are generated and stored. As an example, an E sized document is approximately 1500 square inches. Scanning one E sized document with 200 bit/inch scan resolution requires $1500\times 200\times 200=60$ million bits.

In one document retrieval application, such a system was used to capture and store the images of several hundred thousand engineering drawings and blueprints ranging from A size ($8\frac{1}{2}''\times 11''$) to E size ($34''\times 44''$). The images of individual drawings could be remotely accessed by engineers as needed, In the application, the goal was to allow the option of using a means for modifying documents, both at the central system site and at remote sites. Although documents could be electronically modified at the central site, document modification made at remote sites or by third parties off site had to be performed in the conventional, manual manner: erasing and redrawing.

In the past, document storage, modification and retrieval of modified documents has been done in several ways.

Traditionally, modifications have been made by erasure and addition to a paper original document. This technique is not labor or capital intensive but does not lend itself to document modification at remote sites (since an original document would be required at each site) or to electronic retrieval. A significant problem with modifications to the master original document is that the original often becomes soiled or smudged or folded and information can be buried in the dirt or crease.

Electronic modification and storage of documents could be done on a remotely located raster editing terminal. However, it would be necessary to have a raster editing terminal wherever the modifications might be made. In the situation where modifications are made by third parties it often is not feasible to compel the third party to purchase and install a raster editing terminal. Moreover, raster editing terminals can be expensive.

A third method of modifying documents is to use a computer-aided design (CAD) approach. With a CAD system, once a CAD document model has been created and stored, modifications can be made remotely without the expense of a raster editing terminal. The problem is that creating the CAD model from an existing document is extremely labor intensive. Where several hundred thousand documents are involved, the time and labor cost of creating CAD models for each document can render CAD unfeasible.

A fourth method of modifying documents and storing the modifications is to produce a hardcopy print of the original drawing, manually performed the modifications in the conventional manner by erasure and pencil additions, and then re-scan the modified document. The problem with this method is that with each print-modify-rescan cycle the scanned image experiences a further degradation, limiting the number of times this cycle can be performed, as higher generation scans quickly become unreadable.

SUMMARY OF THE INVENTION

The present invention is used in connection with an electronic document storage, distribution, and retrieval system, in which images of documents are stored in magnetic memory or the like. The invention provides a method and apparatus for electronically storing revisions or modifications to documents which were already stored in the system in their unrevised or unmodified form. According to the invention only the intended or significant modifications to a document are stored in the system: spurious or insignificant modifications due to system noise or other sources are recognized as such and are not entered as modifications. The system recognizes the intended modifications to the document integrates the image of those modifications into the image of the unaltered portions of the document already stored in the system, and stores the composite image for subsequent distribution or retrieval. In this manner the images stored in the system are always composed of first generation scans of the appropriate portions of the original document and of the subsequent modifications. The result is that the composite image of the modified document maintains the resolution and clarity of the original document, with no appreciable degradation, no matter how many times the document is modified.

It is a feature of the invention that insignificant changes due to system errors and the like are recognized and electronically removed from the image. This is especially desirable where the stored document may be revised many times, for otherwise unintentional error changes would be compounded with each revision cycle and could appreciably degrade the stored image quality.

The degradation of information in a document when the document goes through multiple cycles of reproduction is generally referred to as the regeneration problem. The present invention solves the regeneration problem by breaking the regeneration cycle. As pointed out above, regardless of the number of cycles of document retrieval or modification and retrieval made, the quality of the information will be equal to that of the first-generation scan.

The present invention provides an automatic method for detecting significant changes in the modified document. As used herein "significant change" means an addition or deletion to the original document that was intentionally generated. A significant change may be an erasure of a part of the document, an addition to a part of the document that was blank, or an addition that intersects a part of the original document that contains lines or printing. The present invention provides a particularly efficient manner of recognizing regions of intersection between matter on the original document which is to be maintained, and the additional matter added by intentional modification.

Many changes that may appear on the image of the modified document are unintentional and are the result of system noise, binarization error, or displacement or rotation or magnification discrepancies between the two images. Even if no modifications were made to the document electronically comparing on a pixel-by-pixel basis the original document image with a second image of the same document generated by rescanning a duplicate of the original would result in many perceived unintentional changes due to the various error sources discussed.

In the present invention, after a document is intentionally modified, its electronic image is compared to the image of the original document. The invention detects where significant or intentional changes are present and ignores all other changes. The areas of significant change are then entered into memory in place of what was formerly in memory for the same area of the document. All of the unchanged portions of the document image have no changes in memory. The result is to break the regeneration cycle: the unchanged portions of the document are first-generation scan quality; the changed portions of the document likewise are first-generation scan quality. Regardless how many subsequent changes are made to the document, first-generation scan quality will always be preset because no unchanged portion of the document will have required multiple scanning.

In the present invention, it is immaterial whether the modified document consists of successive modifications of a single image, or whether it consists of variations on an image where multiple versions are produced from a base image. As an example, if the document is provided by a preprinted form on which different entries were made, the present invention can, if desired, disregard the unchanging form part of the document, and recognize as modified only the information that has been entered on the form. Such procedure can be applied to economize on the storage of the modified information by not storing the base form with every occurrence.

In applications where there is a requirement for producing as-built documentation for fabricated items, the present invention can produce documentation for the item as fabricated, and can also produce documentation showing only the changes that were made from the initial or base plan.

A further understanding of the nature and advantages of the present invention will be gained by reference to the following portions of the specification and the appended drawings.

BRIEF DESCRIPTION OF THE DRAWINGS

FIG. 1 is a block diagram of a document retrieval and distribution system incorporating the present invention.

FIG. 2 is a block diagram of apparatus showing the flow of a document and document image through the system.

FIG. 3 is a flow diagram illustrating the steps taken by the regeneration processor to produce certain intermediate images, specifically, the additions image the deletions image, the cleaned additions image and the cleaned deletions image.

FIG. 4 is a flow diagram showing the steps taken by the regeneration processor to produce the change-region image and the revised-document image.

FIG. 5A shows a portion of an original stored-document image, in this example, a single black pixel.

FIG. 5B shows a possible additions image obtained when the single pixel is broadened to a larger square of black pixels.

FIG. 5C shows the flagged adjacent-pixel image comprising the nearest, four-connected neighbors of the black pixel in the original image of FIG. 5A that are also in the additions image of FIG. 5B.

FIG. 5D shows the image of FIG. 5C after a region grow.

FIG. 5E shows the stripped additions image obtained by deleting the pixels of the grown image of FIG. 5D from the additions image of FIG. 5B.

FIG. 6 shows an E sized engineering drawing divided into strips for strip processing.

DETAILED DESCRIPTION OF A PREFERRED EMBODIMENT

FIG. 1 provides an overall block diagram of a document storage, retrieval, and distribution system of the type employing the present invention. An original document 10 to be entered into the system is scanned and binarized by a document scanner 12. The binarized image data is communicated to the image controller 15, where it may be compressed by compressor/decompressor 16 and stored on a random access memory, internal to the image controller or may be stored on magnetic disk 18 on a short term basis, or on optical disk 20 for more permanent archival storage.

The image controller 15 also interfaces with a video display terminal 22 and keyboard 24, which may have a raster editing capability and which the system operator may use for data input retrieval and quality control operations. A batch printer 26 is provided for hard copy output of a document, including hard copy to be used for modification and revision of the document. A plurality of remote terminals 28 may be connected to the image controller to remotely retrieve documents and make modifications thereto.

The image controller 15 includes a regeneration processor 30, which generates certain intermediate document images, described hereinbelow, and which perform a sequence of operations on the various images to produce the desired output images associated with a modified document. The regeneration processor 20 includes a working memory 32 provided by several two-megabyte random access memory (RAM) units, which are used for short term retention of the document images generated during the regeneration process. A 68000 family CP board 34 is dedicated to the image manipulations involved with the regeneration process. An additional CPU 36 is used for communications with other portions of the system or with file management for the magnetic disc drive or cluster operations as a whole. An X.25 style high level data link control (HDLC) protocol interface network 38 is used for communications between the regeneration processor and other portions of the system. The regeneration processor uses a VME bus 40 for communications.

In the embodiment illustrated here, the images are processed under the control of the pre-programmed CPU 34. One skilled in microprocessor programming and familiar with known image processing techniques will readily be able to program the CPU 34 in accordance with the teachings provided herein.

FIG. 2 provides an overview of the processing of a document. The original document 10 is scanned, and the binarized data are compressed at compressor 42 and stored in either short term or long term memory 44. In the system actually reduced to practice, the data were compressed using a standard CCITT group 3 compression algorithm, although the compression does not play a role in the present invention, and, in fact, the images are processed according to the invention in their decompressed form.

Alignment marks are electronically inserted on the borders of the image when the document is retrieved from storage by alignment marker 46. At this stage the retrieved document with the alignment marks may be hardprinted at printer 48. The alignment marks are used later in the process to detect and compensate for errors in orientation, magnification and linearity when comparing images.

If desired, the hardcopy print may be modified. which may be performed manually by a draftsman using pencil and eraser in conventional fashion on the hardcopy or through a raster-editing terminal. The modified document is entered into the system by rescanning at the scanner 12, if modified on the hardcopy, or by directly entering the modified bit map of the document image as produced at the raster-editing terminal. The modified document is then re-compressed and stored.

The regeneration process can occur at a later time since both the original-document image and modified-document image are preserved in storage. In the regeneration process, the modified-document image is retrieved from storage upon command and decompressed at decompressor 50. An alignment mark detector 52 locates the alignment marks on the modified-document image and an image aligner 54 electronically superimposes the original-document image and the modified-document image by comparing the alignment marks in the two images.

The alignment marks are typically added electronically to the captured image of the original document and are printed out on any hardcopy to be manually modified. Thus the same alignment marks are re-scanned into the system after the desired modification is made. The alignment marks enable the apparatus to scale, rotate, and translate the modified-document image to coincide closely with the stored-document image. Their use for this purpose is well known to persons in the image processing field and will not be described further.

The aligned modified-document image from the image aligner 54 and the stored-document image are presented to the regeneration processor 30 where the images are compared on a pixel-by-pixel basis. Even if no changes were intentionally made to the document, a comparison of the stored-document image with an aligned but unmodified-document image rescanned into the system would still show differences in pixels because the overwhelming probability is that the re-scan of the same document would produce a different bit map for the image from the original scan. These differences can come from a variety of sources including, for example, the image binarization process.

It is the function of the regeneration processor to determine which changes in the modified-document image are significant (i.e., intentional) changes and should be preserved, and which changes in the modified-document image are insignificant the result of system noise, and should be purged.

The regeneration processor generates multiple output images, two of which will be discussed here: a change-regions image and a revised-document image. The change-regions image consists of portions of the modified document that were intentionally changed (i.e., that had significant differences). The new image consists of those portions of the original document that were not changed and those portions of the original document that were intentionally changed. The revised-document image is identical to the original image in those regions where there were no significant changes, and is identical to the modified image in those regions where significant changes were detected.

FIG. 3 illustrates the manner in which the stored-document image 60 and the modified image 62 are used to generate various intermediate images. Initially, the stored-document image and the modified-document image are compared with each other to produce two intermediate images: a deletions image 64 and an additions image 66. The deletions image consists of pixels that are black in the original document but are white in the modified document (i.e., the black pixels were intentionally or unintentionally deleted from the original). The additions image consists of pixels that are black in the modified image but were white in the original image (i.e., the black pixels were intentionally or unintentionally added to the modified image).

As mentioned earlier, deletions and additions at this point could result from significant modifications to the document, or from another source (such as residual non-alignment or quantization error). It is the purpose of the software processing that is described hereafter to determine which changes in the modified document are significant and should be retained in the final changes and which images are the result of various other sources and should not be retained in the final image. The elimination of insignificant changes from the final image preserves first-generation scan quality of the original document and of the original modifications thereto.

The upper portion of FIG. 3 shows how the stored-document image and the additions image pair are processed to produce a cleaned-additions image (i.e., an image showing only significant additions). The stored-document image 60 and the additions image 66 are subjected to an insignificant-pixel flagging operation 68, which detects and flags the black pixels in the additions image that are adjacent to black pixels in the original image. At this stage these pixels are flagged as possibly being insignificant.

Operation 68 is a region-growing process, Black pixels in the original stored-document image are treated as "seeds," and their nearest neighbors (i.e., immediately adjoining pixels) in the additions image are added to the image consisting of possibly insignificant black images. That image is then grown iteratively within the set of additions image several times to produce a fuller image consisting of insignificant pixels. This operation produces a band around the original image of pixels that are considered insignificant, most commonly the result of quantization noise. Operation 68 is governed by an input parameter, referred to as "seed erode," that may be selected as a function of detail on the original document.

Next, in operation 70 the list of possibly insignificant pixels is expanded by finding all black pixels in the additions image which are adjacent to the flagged black pixels in the additions image. This is an iterative process and is performed as a function of an input parameter referred to as "iso-erode". This parameter may also be operator controlled as a function of detail on the original document. This process is analogous to treating any black pixels in the stored-document image as seeds that are allowed to grow iteratively and contact neighboring pixels. Neighbors in the additions image were added to the image of possibly insignificant pixels. The image of possibly insignificant black pixels was grown within the set of additions image several times to produce a fuller image of possibly insignificant pixels. The purpose of this step is to produce a band around the stored-document image of pixels which are considered to be noise (i.e., insignificant changes). The result of this process produces an image of insignificant black pixels 72.

One the image of insignificant black pixels is determined, the difference between that image and the additions image is used to produce a stripped additions image 74. The stripped additions image consists of additions to the stored-document image that no longer touch the stored-document image. It is possible for a small band or gap to exist between the stripped additions image and the original stored-document image because certain black pixels may have been erroneously interpreted as insignificant and removed from the additions image to produce the stripped additions image. This may occur, for example, where a new line is added when modifying the document, which interests an old line already present on the document. The additions image would not include the black pixels in the intersection of the two lines because these would be recognized as belonging to the original, stored-document image. The stripped additions image might then produce a slight gap between the old line at the intersection and the new line which was added.

An interactive "set grow" process is used to selectively grow the stripped additions image to touch the original stored-document image to reattach pixels that were improperly detached. The number of iterations is determined by a "set grow" parameter which may be user selected as a function of the detail in the original document.

The lower portion of FIG. 3 shows the processing of the modified-document image and deletions image. Recall that the deletions image consists of pixels that are black in the original document but are white in the modified document. The deletions image 64 and the original image 60 are subjected to an insignificant pixel flagging operation 76, which detects and flags white pixels in the deletions image that are adjacent to white pixels in the original image. These pixels are flagged as possibly being insignificant. Through an iterative process analogous to that described above a stripped deletions image 86 is generated, and ultimately a cleaned deletions image 92 is produced. The cleaned deletions image corresponds to what a human would intend to produce by intentionally erasing certain portions of the original document. The parameters that control the iteration process that results in the cleaned deletions image are seed erode and iso-erode and may be user selected as above.

In FIG. 4 the cleaned additions image 78 and the cleaned deletions image 90 are combined with each other in an "OR" logic operation 94 and a combined cleaned changes image 96 is produced. The cleaned additions image and the cleaned deletions image could be coded so that the cleaned additions bits one represented by logic ones and the cleaned deletions bits are also represented by logic ones. If coded in this manner, the combined cleaned changes image will have logic ones at all locations of cleaned additions or deletions. The combined cleaned changes image is then grown interactively at block 96 in all directions to produce a change-region image 98. A parameter, referred to as iso-grow, may be user selected to govern the iterative growth. At block 100 the stored-document image 60, the modified-document image 62, and the change-region image 98 are selectively copied as follows: pixels that are zeros in the change-region image are used as a mask to copy pixels (regardless of value, black or white) from the stored-document image. Pixels that are ones in the change-region image are used as a mask to copy pixels from the modified-document image (regardless of values, black or white). The result of the selective copying is the revised-document image 102. The revised-document image contains all the significant additions and deletions intended by the person who modified the stored document, but it does not contain the degradation due to binarization or quantization error, scalin, distortion or the like. In short, the revised-document image consists of those portions of the original image that were not in any way altered plus those portions of the original image that were intentionally altered.

Alternatively, an output image can be produced which shows only the significant changes and does not show the unmodified portions of the original document. This image could require less memory capacity for storage and is useful for rapidly learning what changes were made on a document. Such an output image, or at least the bit map corresponding to the output image, is especially useful in storing images of standard forms which are filled out by a number of individuals. The significant-change image corresponds to the information added by the individual. A great savings in memory is achieved in those systems employing data compression because the underlying standard form need not be compressed with every document. With the underlying form stripped away, the remaining data will generally be subject to much greater compression.

Other output images are also available, for example, the system can also be configured to provide an image that corresponds to deletions.

The processing of images according to the invention has been generally discussed above. A more detailed exposition is now given of the specific operations for processing pixels. FIG. 5 demonstrates in greater detail various iterative steps in the growth and erosion process. "Growth" or "erosion" operations are isotropic and four-connected. That is to say, if the system grows or seeds a pixel, say a black pixel, the system proceeds up, down, left, and right from the black pixel and makes the neighboring pixels black also. Seed erosion is accomplished similarly. If a pixel was initially white, for example, and all surrounding pixels were black, then the adjacent neighboring pixels (up, down, left, and right) would be set to white.

Three parameters determine the number of iterations in the regenerative processor. These are:

iso-erode concerns the stripping away of pixels (block 70);

set grow affects the reattachment of pixels that should be connected (block 76);

iso-grow concerns the widening of regions where changes might have occurred (block 96).

The above parameters may be preset in the system or may be user selected as a function of the type of detail present on the modified document. These parameters will be discussed in detail in the following paragraphs.

An example of seed erode operation is as follows. FIG. 5A shows a portion of a possible original stored-document image. FIG. 5B shows a possible additions image. The next step is to find all neighbors in an isotropic four-connected neighborhood of black pixels in the original image that are also in the additions image. The result of that image is the flag adjacent pixel image (FIG. 5C). These pixels are candidates for insignificant pixels. Pixels from the additions image based on their adjacency to black pixels in the original image. The image of FIG. 5C is used as the starting point for a set-erosion operation. The black pixels in the image of FIG. 5C will all be considered seeds and the image of FIG. 5C will be grown in all four directions to produce FIG. 5D. Next the image of FIG. 5D and the image of FIG. 5B (the previous additions image) will be subjected to a logical operation to delete or erode the pixels of FIG. 5D from the image in this set.

The software is preferably devised such that the user may set the number of growth or erosion iterations to be performed by setting the three parameters mentioned above.

The objective of these operations is as follows. New pixels in a modified-document image lying close to an original pixel (from the stored-document) of like color are likely candidates to have been generated by differences in quantization. The resulting image removes everything that could have been just a slightly different version of the original image. Whatever remains is considered to be a significant addition.

The "iso-erode" parameter governs stripping and affects the operation at block 70. It sets the number of times that flagged insignificant pixels are expanded within the set of addition image pixels. Iso-erode determines a band around the original image where black pixels were initially considered to be insignificant and were stripped off. As a side effect in the stripping process, pixels that connect valid additions to the original image or valid deletions were also stripped off. The replacement of these valid pixels is handled by the second parameter, set grow.

Set grow concerns the reattachment of pixels and results in adding inadvertently stripped pixels back into the addition or deletion image. Set grow controls the number of iterations for reconnecting the stripped additions to the original image. With reference to FIG. 3, set grow affects the operations at block 76. The purpose of set grow operation is in some sense analogous to that of the iso-erode operation in that, e.g., if three pixel layers were eroded off a portion of the initial stored-document image, it would be necessary to grow at least three layers to reconnect valid additions to the original image.

The third parameter, iso-grow, is for widening or enlarging the regions where it was determined that changes have occurred. Iso-grow controls the number of iterations at block 96 of FIG. 4. At the previous block 94 a combined cleaned changes image was produced from the OR union of the cleaned additions image and the cleaned deletions image. The combined cleaned changes image consists of all detected additions and deletions. A problem can arise when there is fine overlapping detail in the modified document. The pixel-stripping process steps intended to filter out insignificant changes may not be corrected in the set-grow operation because of the fine overlapping detail. In these situations there is no segment left with which to reconnect. The segments have been entirely eroded away. The problem is corrected by enlarging the region rather than the alternative approach of precisely detecting additions and deletions. In the iso-grow process, regions of change are flagged by isotropically allowing the combined cleaned changes image 96 to grow to expand the region of change slightly into the surrounding area.

The type of documents with which the present system may be used may encompass any type of graphics or writing on paper. The documents typically range from $8\frac{1}{2}''\times 11''$ office type documents with text and/or graphics, to large E sized ($34''\times 44''$) engineering or architectural documents.

As mentioned above, there is a trade-off in the scanning-binarization process: capture of fine detail in a document requires high resolution scanning and is relatively expensive to produce because a larger number of data bits are generated and stored. As an example, an E sized document is approximately 1500 square inches. Scanning one E sized document with 200 bit/inch scan resolution requires $1500\times 200\times 200=60$ million bits.

Such large amounts of data place a significant burden upon the memory requirements of the data system. This burden is multiplied several-fold where the system generates several intermediate images in the course of producing the final processed image. A number of processing innovations must be employed in order to economize memory requirements.

In the system described, for example, segments of an image may be processed in blocks of vertical strips. As an example, an E-sized document is $34''\times 44''$. The $34''$ side is processed one raster line at a time, where each line contains 7.16 pixels. The 7.168 pixels represents an intentional overscan, since $34''\times 200$ lines/inch scanning would produce only 6800 pixels. The $44''$ side of the document is similarly overscanned to produce 9,216 lines, rather than 8,000. The 9216 lines are processed in strips of 256 lines/strip. One strip of data then is 1 line high by 256 lines in width. FIG. 6 illustrates how the strips are defined.

In the early phases of the processing, the potential for error from alignment and other sources is greatest, and it is therefore necessary to handle several strips at a time. The present system optimizes the data processing by initially handling data in groups of 3 strips rather than processing data with all 36 strips. This technique results in a 12-fold saving in memory (i.e. 3:36).

The stored-document image, the modified-document image, and the aligned modified image are each processed in groups of three full (i.e., 256 line width) strips at a time to obtain context data. Context refers to information from surrounding pixels contained in neighboring strips concerning how the pixels in a strip appear to agree with data in neighboring strips. With reference to FIG. 6, strips (N−1) and (N+1) are processed to provide context data for strip N. Strips beyond the actual drawing image (i.e., strips adjacent to the far edges of the drawing) are treated as being white.

Once the image has been aligned, the potential for gross error is lessened and therefore further processing may be done in a more refined manner by selectively fattening the width of each strip handled. Rather than utilize data from an entire $N+1$ or $N-1$ neighboring strip, further iteration involves only a few lines from the $N-1$ and $N+1$ neighboring strips. The "fattening" of the strip being processed from 256 lines to some greater width is required to provide image space to accommodate image growth that may occur during the iterative process. The width of each strip processed is varied from 256 lines to some greater number of lines as a function of the set grow, seed erode and iso-grow parameters. The increased width or increased image space is determined by these parameters. For example, the width of the processed strips for the additions image, deletions image, stripped additions image, stripped deletions image, cleaned additions image and cleaned deletions image is increased from 256 lines by X lines, where $X=1+2N+2M+2K$, where N=seed grow parameter, M=seed erode parameter and K=iso grow parameter.

The selective growing of a strip N by a select number of lines from its neighboring strips as opposed to growing by entire achieves a great economy of memory.

The invention has now been described with reference to specific embodiments. Various modifications and substitutions will be apparent to persons skilled in the relevant arts. For example, it will be readily apparent that the various region growing operations and other operations described above as performed by the software of CPU 54 may also be implemented in hardware where speed of operation is of greater concern. Moreover, those skilled in the art will recognize that other combinations of intermediate images can be utilized, instead of the stored-document/additions image pair and the modified-document/deletions image pair, as a starting point to derive the desired output images. In addition, other known memory-saving techniques may be employed to increase throughput without departing from the spirit and teachings of the present invention. Accordingly, it is not intended that the invention be limited to the specific embodiments described herein, but is defined by the appended claims.

What is claimed is:

1. In a system for electronically capturing and storing images of documents in which stored documents are represented by bit maps identifying black and white pixels of the images, a method of storing modifications to a document having a representative bit map already stored in the system, comprising the steps of:

forming a binary modified-document bit map representing a modification of a binary stored document bit map;

comparing, pixel-by-pixel, said modified-document bit map with the stored document bit map to determine differences between said stored-document bit map and said modified-document bit map;

determining, pixel-by-pixel, which of said differences are significant and which are insignificant;

storing in a memory a significant-difference bit map representing the significant differences between said stored document bit map and said modified document bit map; and forming a revised document bit map composed of portions of the stored document bit map containing no significant bit map differences together with said significant-difference bit map, whereby said insignificant bit map differences are excluded from said revised-document bit map.

2. The method of claim 1, further comprising the steps of:

defining, pixel-by-pixel, a change-region bit map from said significant-difference bit map; and forming said revised-document bit map with said change-region bit map.

3. The method of claim 1, further comprising the step of:

forming an additions bit map and a deletions bit map for recording said differences between said stored document and modified-document bit maps, said additions and deletions bit maps identifying pixels in said modified-document bit map which have changed, respectively, from white to black and from black to white compared with said stored-document bit map.

4. The method of claim 3, further comprising the steps of:

identifying as insignificant the pixels of said additions and deletions bit maps which are located adjacently to like colored pixels of said stored-document bit map.

5. The method of claim 4, further comprising the steps of:

deleting said insignificant pixels from said additions and deletions bit maps to form stripped-additions and stripped-deletions bit maps; and selectively causing said stripped-additions and stripped-deletions bit maps to be modified so as to selectively connect pixels of said stripped-additions and stripped-deletions bit maps with colored pixels of said stored-document bit map.

6. The method of claim 1, wherein said modifications comprise entries made on a standard form document, further comprising the step of storing a stored-form bit map representing said standard form document with no entries thereon, and wherein said stored-document bit map consists of said stored-form bit map.

7. The method of claim 2, further comprising the steps of:

selectively causing said significant-difference bit map to be modified to define a change-region bit map.

8. The method of claim 2, wherein said step of forming said revised-document bit map further comprises the steps of:

copying pixels of said stored-document bit map which correspond to a first logic value of said change region bit map; and copying pixels of said modified-document bit map which correspond to a second logic value of said change-region bit map.

* * * * *